US008177198B2

(12) United States Patent
Sechrist

(10) Patent No.: US 8,177,198 B2
(45) Date of Patent: *May 15, 2012

(54) QUENCH ZONE DESIGN USING SPRAY NOZZLES

(75) Inventor: Paul A. Sechrist, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 789 days.

This patent is subject to a terminal disclaimer.

(21) Appl. No.: 12/147,011

(22) Filed: Jun. 26, 2008

(65) Prior Publication Data

US 2009/0321966 A1 Dec. 31, 2009

(51) Int. Cl.
*B01F 3/04* (2006.01)
(52) U.S. Cl. .................. 261/97; 261/114.5; 239/124
(58) Field of Classification Search .................. 261/97, 261/114.5; 239/124
See application file for complete search history.

(56) References Cited

U.S. PATENT DOCUMENTS

| | | | | |
|---|---|---|---|---|
| 3,502,445 A * | 3/1970 | Hines, Jr et al. | ........... | 422/607 |
| 3,541,000 A * | 11/1970 | Hanson et al. | ............ | 208/108 |
| 3,824,080 A * | 7/1974 | Sanwald | .............. | 422/605 |
| 3,824,081 A * | 7/1974 | Jones | .................. | 422/217 |
| 4,948,568 A | 8/1990 | Chessmore et al. | ........ | 422/140 |
| 5,242,577 A | 9/1993 | Betts et al. | ............... | 208/157 |
| 5,403,560 A * | 4/1995 | Deshpande et al. | ........ | 422/606 |
| 5,554,346 A * | 9/1996 | Perry et al. | ............... | 422/605 |
| 5,567,396 A * | 10/1996 | Perry et al. | ............... | 422/606 |
| 5,635,145 A * | 6/1997 | Den Hartog et al. | ........ | 422/606 |
| 5,837,208 A * | 11/1998 | Grott et al. | ............... | 422/606 |
| 5,942,197 A * | 8/1999 | Gupta et al. | ............... | 422/605 |
| 6,299,759 B1 | 10/2001 | Bradway et al. | ............ | 208/59 |
| 6,403,854 B1 * | 6/2002 | Miller et al. | .............. | 585/638 |
| 6,726,748 B2 | 4/2004 | Goode et al. | .............. | 95/199 |
| 6,769,672 B2 * | 8/2004 | Müller | .................. | 261/114.2 |
| 6,984,365 B2 * | 1/2006 | Nelson et al. | ............. | 422/224 |
| 7,045,103 B2 * | 5/2006 | McDougald et al. | ........ | 422/605 |
| 7,052,654 B2 * | 5/2006 | McDougald et al. | ........ | 422/605 |
| 7,101,474 B2 | 9/2006 | Sattar | .................... | 208/113 |
| 7,276,215 B2 | 10/2007 | Müller | .................. | 422/224 |
| 2002/0172632 A1 * | 11/2002 | Chou | .................... | 422/220 |
| 2004/0028579 A1 * | 2/2004 | Van Der Meer et al. | ...... | 422/194 |
| 2004/0228779 A1 * | 11/2004 | McDougald et al. | ........ | 422/191 |
| 2004/0234434 A1 * | 11/2004 | Muldowney et al. | ........ | 422/224 |
| 2006/0163758 A1 | 7/2006 | Müller | .................. | 261/114.1 |
| 2006/0257300 A1 * | 11/2006 | Breivik et al. | ............. | 422/195 |
| 2009/0324464 A1 * | 12/2009 | Sechrist | ................ | 422/194 |

FOREIGN PATENT DOCUMENTS

| | | |
|---|---|---|
| EP | EP 66354 B1 | 1/1985 |
| EP | EP 933123 A2 | 4/1999 |
| GB | GB 597086 A | 1/1948 |
| WO | WO2006/034868 A1 | 6/2006 |

* cited by examiner

*Primary Examiner* — Robert J Hill, Jr.
*Assistant Examiner* — Christopher P Jones
(74) *Attorney, Agent, or Firm* — Mark R Willis

(57) ABSTRACT

A liquid distribution device is presented for the collection and distribution of liquid between reactor or adsorbent beds. The device includes a liquid collection tray, a mixing chamber in fluid communication with the liquid collection tray, a liquid distribution tray in fluid communication with the mixing chamber, and a plurality of nozzles for delivering the liquid over the top of a reactor or adsorbent bed.

14 Claims, 2 Drawing Sheets

QUENCH ZONE DESIGN USING SPRAY NOZZLES

FIELD OF THE INVENTION

This invention relates to a device for distributing liquid uniformly over the cross-section of a reactor bed. The device resides between two reactor beds where the effluent from an upper bed is collected and redistributed over the top of the lower bed.

BACKGROUND OF THE INVENTION

A wide variety of processes use co-current flow reactors, or reactors where there is a single phase fluid that flows over a solid bed of particulate materials, to provide for contact between the fluid and a solid. In a reactor, the solid usually comprises a catalytic material on which the fluid reacts to form a product. The fluid can be a liquid, vapor, or mixture of liquid and vapor, and the fluid reacts to form a liquid, vapor, or a mixture of a liquid and vapor. The processes cover a range of processes, including hydrocarbon conversion, gas treatment, and adsorption for separation.

Co-current reactors with fixed beds are constructed such that the reactor allows for the fluid to flow over the reactor bed. When the fluid is a liquid, or liquid and vapor, the fluid is usually directed to flow downward through the reactor. There are many aspects for providing good contact between the fluid and the solid. Multibed reactors are also frequently used, where the reactor beds are stacked one over the other within a reactor shell. Typically, they are stacked with some space between the beds.

With multibed reactors the space between beds are convenient mixing zones. The between bed spaces are often used to provide for intermediate treatment of the process fluid, such as cooling the process fluid, heating the process fluid, or remixing and redistribution of the process fluid.

In exothermic catalytic reactions, the control of temperature is important, and the multibed system provides a convenient place for the injection of a quench gas. In hydrocarbon processing, the quench gas is often a cool hydrogen stream. However, cooling a fluid without controlling the mixing and distribution leads to uneven heating and reactions in subsequent reactor beds. And complex mixing and distribution systems takes up valuable space in a reactor chamber holding multiple reactor beds.

The design of reactors to overcome these limitations can save significantly on the valuable space within a reactor and to better utilize a reactor chamber. Hardware for holding a reactor, the reactor shell, is expensive, and takes significant time to design and construct before putting into operation. New reactor internals that improve the utilization of the space within a reactor shell can provide significant cost savings, and obviate the need for new reactor shell components, as well as prevent the down time for replacing an entire reactor.

SUMMARY OF THE INVENTION

The present invention provides a novel device for reducing the space needed for collection and redistribution of a liquid over the top of a reactor bed. The device comprises a liquid collection tray for collecting liquid from a reactor bed above the device. The collection tray passes the liquid to a mixing chamber through outlet ports that are oriented to deliver the liquid in a swirling motion in the mixing chamber. The mixing chamber mixes the liquid and is defined by the space between the liquid collection tray and the liquid distribution tray. The mixed liquid spreads out over the liquid distribution tray. The liquid distribution tray comprises a tray, having a plurality of outlets. The device includes a plurality of spray nozzles, with a spray nozzle affixed to each liquid distribution outlet, and for delivering the liquid over the top of a catalyst bed. Since the liquid is educed through the liquid distribution tray, it is relatively insensitive to the tray being out of level.

In another embodiment, the device includes a plurality of vapor pipes, where each vapor pipe has an opening in fluid communication with the vapor space below the liquid distribution tray and an opening in fluid communication with the vapor space above the liquid collection tray. This provides a means for the vapor to provide the motive force for ensuring uniform liquid flow through each of the distributor tray openings, by eduction, even when the liquid level is not uniform inside the mixing chamber.

Other objects, advantages and applications of the present invention will become apparent to those skilled in the art from the following detailed description and drawings.

DETAILED DESCRIPTION OF THE INVENTION

Figure 1:
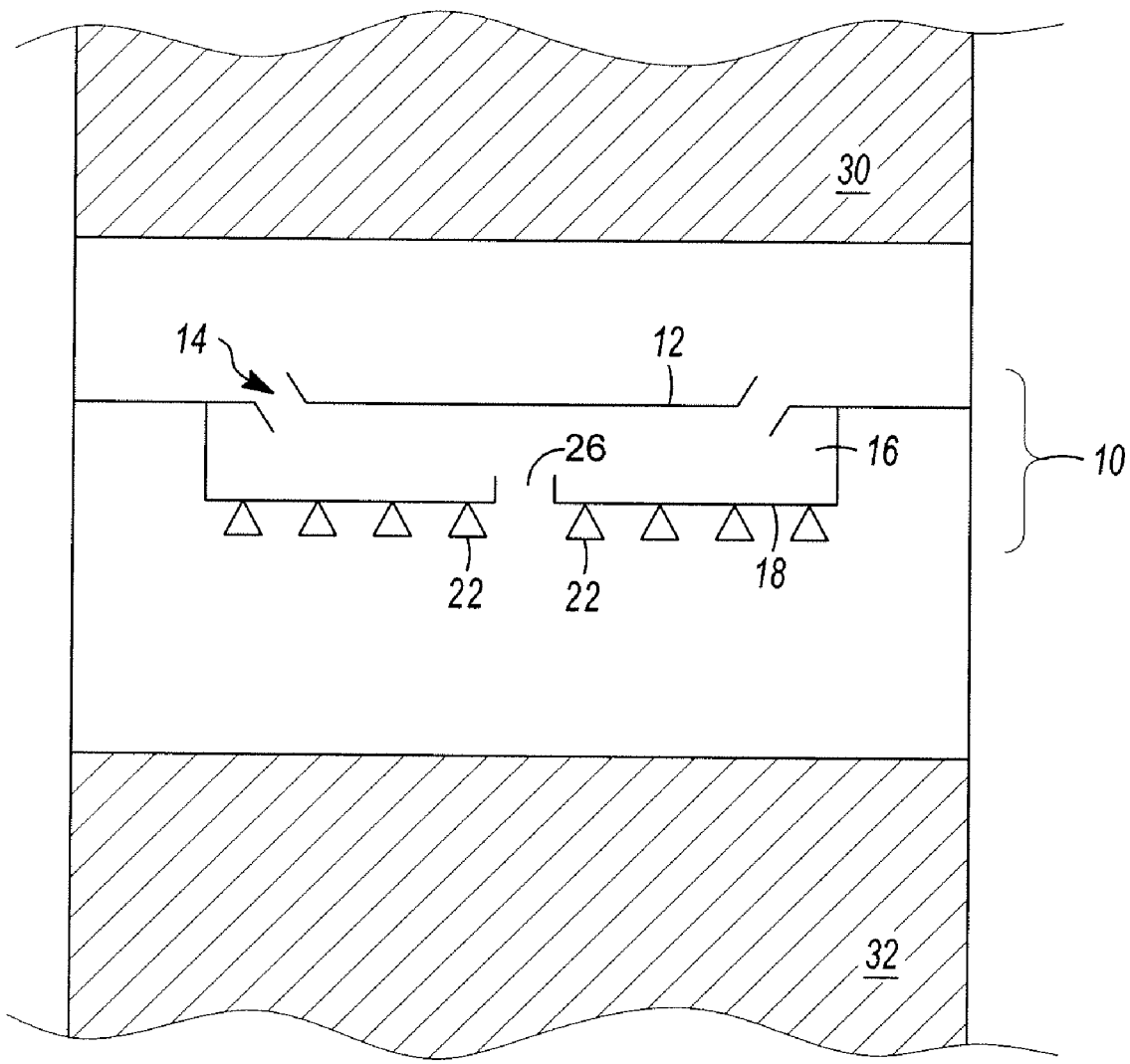
FIG. 1 is a schematic of the device for distributing liquid over the top of a reactor bed.

The improvements in hydrocarbon processing include improving the utilization of equipment currently in use. One aspect of improving the utilization, is to reduce the volume of space for functions within processing chambers. An example in hydrocarbon processing, there are often multiple reactors beds stacked in series for processing. The reactor beds are separated by quench zones, where the quench zone is designed to cool, and sometimes condense, a reactor effluent from a reactor bed above. The reactor effluent is quenched with a quench gas or liquid, and the effluent is mixed and passed to the reactor bed below. The effluent is mixed to minimize temperature and concentration gradients in the effluent before passing the effluent to the reactor bed below the quench zone. There is considerable space between the reactor beds for the quench zones, and a reduction in the amount of space needed for the quench zones can allow for more reactor beds that improves processing without replacing an entire processing column, which is an expensive piece of equipment.

Good distribution of liquids over a reactor bed are important because poor distribution leads to adverse effects, such as uneven temperature rise. An uneven temperature rise can lead to a shortened catalyst life, to hot spots within the reactor, or to unstable reactions due to heightened localized temperatures. Many commercial units for reactors have significant temperature gradients in the radial direction, often between 6° C. and 27° C. The present invention is designed to reduce the radial temperature gradient to 2° C. to 3° C.

The present invention provides a new quench zone device that reduces the spacing, or height, between neighboring reactor beds. This reduces the overall size of the reactor equipment, or can be used to create more reactor bed volume in an existing reactor shell, and provides improved distribution of liquids over the reactor bed. By realizing that there is no need to thermally equilibrate the liquid and vapor phases relative to each other, the liquid can be mixed and distributed over the reactor bed to provide a substantially uniform temperature across the bed in the radial direction.

Currently, for a system with an exothermic catalytic reaction, a cool quench gas is injected at a position near the center axis, and sprayed in an outward radial direction above the collection tray. The spray contacts the vapor and liquid flowing downward from the reactor bed above the quench zone. Heat transfer between the two gases is a matter of gas mixing which depends on the momentum exchange between the two vapor streams. Heat transfer to the liquid is through the transfer of heat across the liquid droplet surface area.

If the mixed quench gas and vapor from the bed above were uniformly distributed to the distribution device, and the liquid was also evenly distributed, then the vapor and liquid would not need to be the same temperature, as there is more than enough interfacial area created to reach the same temperatures in the vapor and liquid. However, it is not necessary to have the vapor enter the mixing chamber, and this allows flexibility in the design.

The present invention comprises a device 10 for the distribution of liquid over the top of a reactor bed, as shown in FIG. 1. The device 10 collect liquid from a reactor bed 30 disposed above the device 10, then mixes the liquid and distributes the liquid to a reactor bed 32 disposed beneath the device 10. The device 10 has a liquid collection tray 12 and outlets 14 from the tray 12 to a liquid distribution tray 18. The space between the liquid collection tray 12 and the liquid distribution tray 18 forms a mixing chamber 16 wherein the liquid entering from the liquid collection tray 12 is swirled and mixed. The liquid distribution tray 18 has a plurality of openings and where each opening has a liquid spray nozzle 22 affixed.

The nozzles 22 are distributed in an even pattern over the distribution tray 18 and have a spray angle between 90 and 150 degrees, and preferably the spray angle is between 105 and 115 degrees. An even pattern is intended to include any uniform density of spray nozzles 22 over the distribution tray 18, and including rectangular or triangular arrays of nozzles. It is preferred to have sufficient nozzles 22 to minimize the distance between the nozzles 22 and the top of the reactor bed 32. A preferred distance is between 10 and 30 cm. (4 to 12 inches), and more preferred distance is between 10 and 18 cm. (4 to 7 inches). A triangular array of nozzles distributed over the liquid distribution tray should provide some overlap and provide an even distribution of liquid over the top of the reactor. It is preferred for this embodiment, that the nozzles are two phase nozzles and spray both the liquid and vapor. The spray nozzles 22 give a more uniform distribution of liquid to the top of the catalyst bed over the dribble flow of bubble caps.

Figure 2:
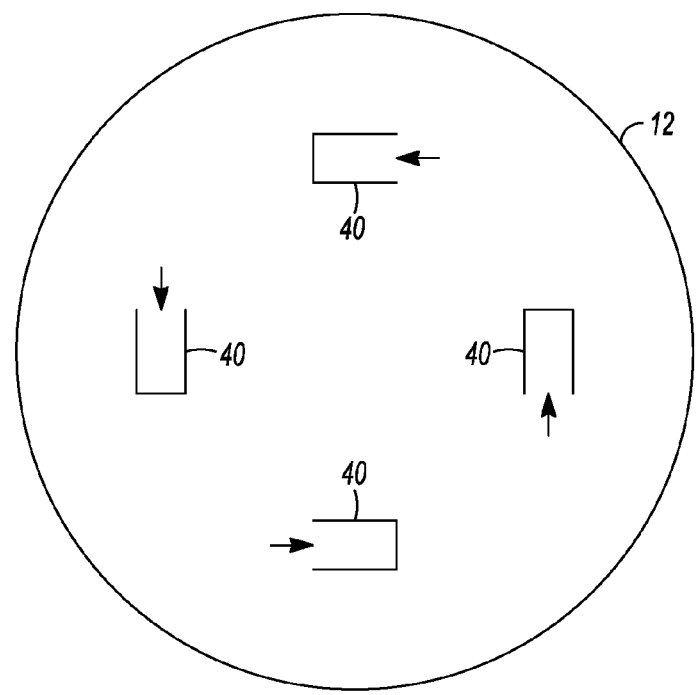
FIG. 2 is a schematic of the liquid collection plate for directing liquid to the mixing chamber.

The liquid collection tray 12 should deliver the liquid into the mixing chamber 16 through a plurality of channels 40 arrayed circumferentially around the collection tray 12, as shown in FIG. 2. Each channel 40 directs the flow of liquid in a direction perpendicular to the radial direction, and therefore the flow will be circumferential with a downward component. The flow will generate a swirling flow in the mixing chamber 16 and mix the liquid minimizing thermal and compositional gradients through the liquid.

The device 10 further includes a quench gas injection into the space between the catalyst beds 30, 32. When there is a quench gas injection, it is preferred to inject the quench gas in the vapor space above the liquid collection tray 12. The quench gas is injected at a position on or near the centerline axis of the reactor. The quench gas is injected in the radial direction such that the flow of quench gas is transverse to the flow of the liquid and vapor from the reactor bed 30. For the injection of quench gas, the injector comprises a spray head having a plurality openings arrayed circumferentially around the spray head.

In the above mentioned embodiment, the spray nozzles 22 are single phase liquid nozzles, and the vapor is passed through a center spillway 26. The swirling flow of in the mixing chamber is sufficient to separate the liquid and the vapor. The liquid level forms a gradient over the liquid distribution tray 18, with the lowest liquid level toward the center of the tray 18.

In another embodiment, the liquid distribution tray 18 can include an optional center spillway 26. The center spillway 26 having a weir to retain some level of the liquid and the liquid is sprayed through the nozzles 22. The vapor passes through the center spillway 26 to the space between the liquid distribution tray 18 and the lower reactor bed 32.

In an alternative to the center spillway 26, the device 10 can include vapor pipes for the vapor to bypass the mixing chamber 16. The vapor pipes (not shown) are tubes that have an outlet in fluid communication with the space below the liquid distribution tray 18 and an inlet in fluid communication with the space above the liquid collection tray 12.

Figure 3:
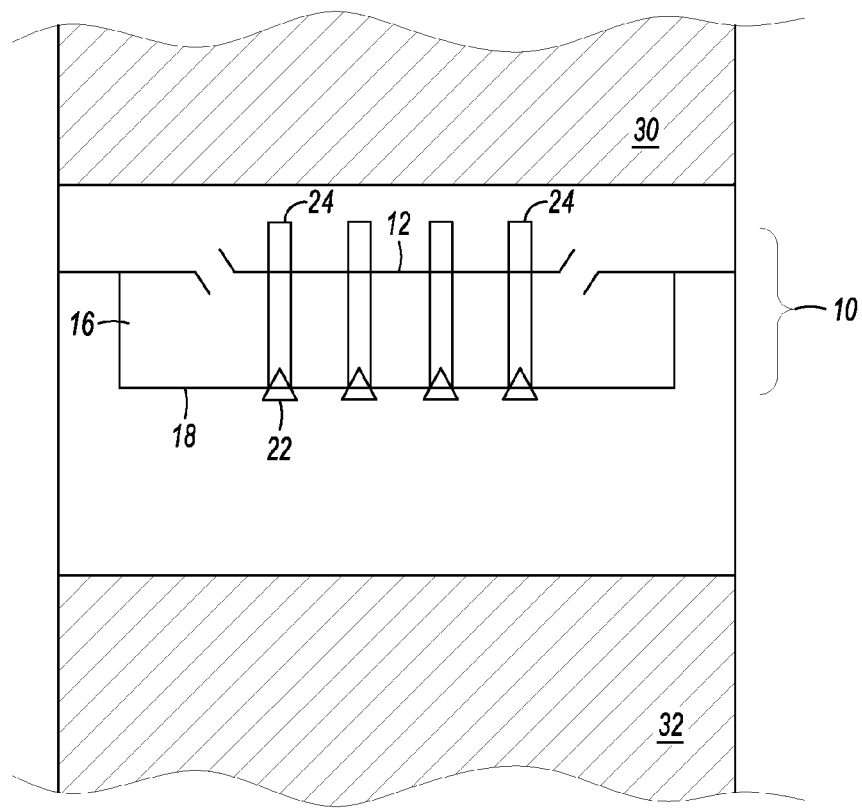
FIG. 3 is a schematic of the device for distributing liquid including the use of vapor pipes for passing vapor from above the device to each nozzle in the distribution tray.

Another alternative is shown in FIG. 3 which includes the vapor pipes 24. Each nozzle 22 includes a vapor pipe 24 for educing the liquid through the spray nozzle 22, and where each vapor pipe 24 has a first opening in fluid communication with the space below the liquid distribution tray 18 and a second opening in fluid communication with the space above the liquid collection tray 12. The use of vapor pipes 24 minimizes the height of the mixing chamber 16 and facilitates a reduction in the overall size of the device 10. In this embodiment, the liquid distribution tray 18 can also include an optional center spillway 26. The center spillway 26 having a weir to retain some level of the liquid and the liquid is sprayed through the nozzles 22. The center spillway 26 allows a portion of the vapor to pass through the center spillway 26, bypassing the nozzles 22, to the space between the liquid distribution tray 18 and the lower reactor bed 32. This can be used to control the rate of flow of vapor through the vapor pipes 24, which in turn helps regulate the flow of liquid through the nozzles 22.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A device for the distribution of liquid over the top of a reactor bed, comprising: a liquid collection tray having a top and a bottom, having outlet ports therein; a liquid distribution tray in fluid communication with the liquid collection tray outlet ports and affixed to the bottom of the liquid collection tray thereby creating a mixing chamber between the liquid collection tray and the distribution tray, and where the distribution tray has a plurality of openings on the bottom of the distribution tray; and a plurality of liquid spray nozzles, where each nozzle is disposed in an opening of the liquid distribution tray wherein said liquid collection tray, said liquid distribution tray and said plurality of liquid spray nozzles are in a reactor and above a reactor bed within said reactor; and wherein the fluid communication between the liquid distribution tray and the liquid collection tray comprises a plurality of channels arrayed circumferentially around the liquid collection tray, and where each channel directs the flow of liquid in a direction perpendicular to the radial direction to separate at least a portion of the liquid from a vapor phase; and further including vapor pipes configured for having an outlet in fluid communication with a space below the liquid distribution tray and above an inferior reactor bed and an inlet in fluid communication with a space above the liquid collection tray and below a superior reactor bed.

2. The device of claim 1 where the spray nozzles are distributed in an even pattern over the distribution tray.

3. The device of claim 1 wherein the spray nozzles have a spray angle between 90 and 150 degrees.

4. The device of claim 3 wherein the spray nozzles have a spray angle between 105 and 115 degrees.

5. A reactor comprising a reactor bed and the device of claim 1 wherein the distance between the spray nozzles and the top of the reactor bed is between 10 and 30 cm.

6. The device of claim 1 further including a quench gas injection injector, where the injection of liquid by the injector is in the radial direction and the position of injection is along a centerline axis.

7. The device of claim 6 wherein the quench gas injection injector comprises a spray head disposed along the central axis of the reactor in a quench zone and with a plurality of ports for admitting quench gas into the quench zone.

8. The device of claim 6 wherein the quench gas injection injector is above the liquid collection tray.

9. The device of claim 1 wherein the outlet ports on the liquid collection tray are arrayed circumferentially around the liquid collection tray, and are oriented to deliver the liquid from the liquid collection tray in a direction perpendicular to the radial direction and with a circumferential component.

10. The device of claim 1 wherein the liquid spray nozzles each include a vapor pipe having a first opening in fluid communication with a spray nozzle and a second opening in fluid communication with the space above the liquid collection tray.

11. A device for the distribution of liquid over the top of a reactor bed, comprising: a liquid collection tray having a top and a bottom, having outlet ports therein; a liquid distribution tray in fluid communication with the liquid collection tray outlet ports and affixed the bottom of the liquid collection tray, where the distribution tray has a plurality of openings on the bottom of the distribution tray, thereby creating a mixing chamber between the liquid collection tray and the distribution tray; and a plurality of liquid spray nozzles, where each nozzle is disposed in an opening of the liquid distribution tray, wherein each spray nozzle includes a vapor pipe having a first opening in fluid communication with a spray nozzle and a second opening in fluid communication with a vapor space above the liquid collection tray, and wherein the spray nozzles have spray angles between 105 and 115 degrees.

12. The device of claim 11 wherein the distance between the spray nozzles and the top of the reactor bed is between 10 and 30 cm.

13. The device of claim 11 wherein the fluid communication between the liquid distribution tray and the liquid collection tray comprises a plurality of channels arrayed circumferentially around the liquid collection tray, and where each channel directs the flow of liquid in a direction perpendicular to the radial direction and with a horizontal component for the flow direction, thereby imparting a swirling flow on the liquid distribution tray.

14. A device for the distribution of liquid over the top of a reactor bed, comprising:
- a liquid collection tray having a top and a bottom, having outlet ports therein;
- a liquid distribution tray in fluid communication with the liquid collection tray outlet ports and affixed the bottom of the liquid collection tray thereby creating a mixing chamber between the liquid collection tray and the distribution tray, and where the distribution tray has a plurality of openings on the bottom of the distribution tray;
- a plurality of spray nozzles, where each nozzle is disposed in an opening of the liquid distribution tray; and
- a plurality of vapor pipes, where each vapor pipe has a first opening in fluid communication with a spray nozzle and a second opening configured for being positioned in a reactor in fluid communication with the space above the liquid collection tray and below the reactor bed.

* * * * *